(12) United States Patent
Richter

(10) Patent No.: US 7,789,357 B2
(45) Date of Patent: Sep. 7, 2010

(54) ROTATIONALLY FIXED RELEASABLE CONNECTION BETWEEN A FUNCTIONAL COMPONENT AND A CONNECTING PART

(76) Inventor: Harald Richter, Höhenstrasse 32, 75331 Engelsbrand (DE)

( * ) Notice: Subject to any disclaimer, the term of this patent is extended or adjusted under 35 U.S.C. 154(b) by 343 days.

(21) Appl. No.: 11/788,400

(22) Filed: Apr. 19, 2007

(65) Prior Publication Data

US 2007/0254537 A1    Nov. 1, 2007

(30) Foreign Application Priority Data

Apr. 28, 2006    (DE) .................. 20 2006 007 040 U

(51) Int. Cl.
*A45D 42/14* (2006.01)
(52) U.S. Cl. .................. 248/205.8; 248/206.2; 248/160
(58) Field of Classification Search ............. 248/231.9, 248/160, 104, 205.5, 205.6, 205.8, 206.2, 248/309.3; 403/374.1, 374.2, 374.3, 314
See application file for complete search history.

(56) References Cited

U.S. PATENT DOCUMENTS

| | | | |
|---|---|---|---|
| 2,510,198 A * | 6/1950 | Tesmer .................. | 248/229.25 |
| 3,721,463 A | 3/1973 | Attwood et al. | |
| 4,388,014 A * | 6/1983 | Wlodkowski et al. ....... | 403/369 |
| 5,156,365 A * | 10/1992 | McCaig et al. .............. | 248/160 |
| 6,193,197 B1 * | 2/2001 | Lian ......................... | 248/206.2 |
| 7,021,593 B1 * | 4/2006 | Fan .......................... | 248/206.2 |

* cited by examiner

*Primary Examiner*—Gwendolyn Baxter
(74) *Attorney, Agent, or Firm*—Klaus J. Bach

(57) ABSTRACT

In a releasable rotationally fixed mechanical connection between a functional part and a connecting part of which one is provided with a receiver neck and the other with an insertion element adapted to be snugly received in the receiver neck, an intermediate wedge member provided with slightly conical outer surface areas is disposed on the insertion element for reception in the receiver neck which has cooperating inner surfaces with which the wedge member is pressed into firm engagement by a collar disposed on the insertion element which is threaded onto the receiver neck.

8 Claims, 2 Drawing Sheets

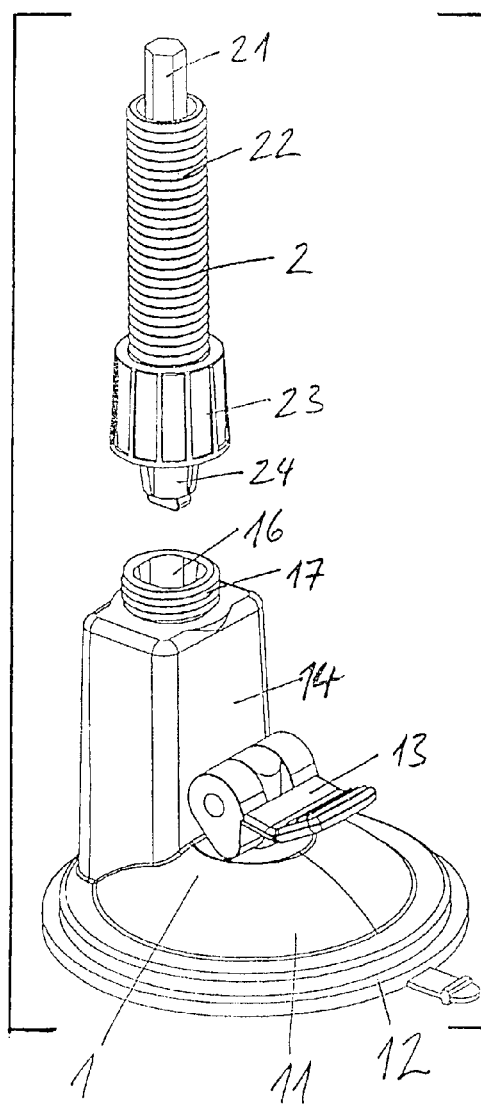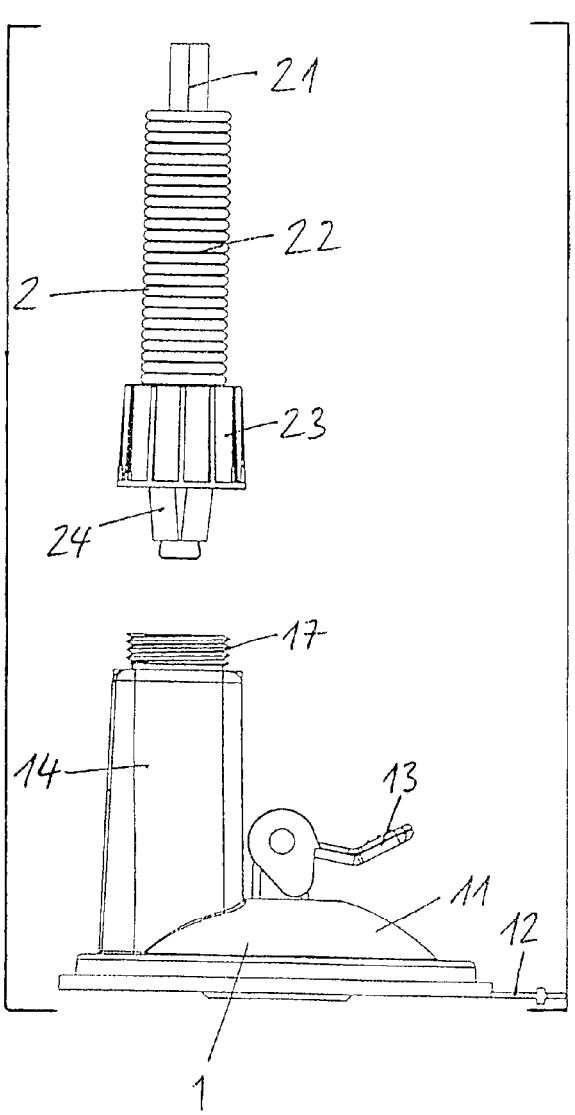

000# ROTATIONALLY FIXED RELEASABLE CONNECTION BETWEEN A FUNCTIONAL COMPONENT AND A CONNECTING PART

BACKGROUND OF THE INVENTION

The invention resides in a rotationally fixed releasable mechanical connection between a functional part and a connecting part with a receiver neck provided on one part and a wedge-like insert element provided on the other part and an engagement means for axially biasing the functional and connecting parts into firm engagement with each other. The functional part may for example be a suction mounting socket and the connecting part may be a support structure known for example as a gooseneck.

The connecting part according to the invention may used for example in connection with different support devices for navigation apparatus, minicomputers or mobile telephones in motor vehicles by means of suction sockets or sockets mounted firmly at some place in a motor vehicle so that goose necks or other support arms are exchangeable and can selectively be used in the form of longer or shorter arms or other exchangeable support components.

Apparatus support devices with suction mounting sockets or other mounting structures, for example cemented or screwed-on sockets provided with gooseneck support arms are well known in various forms. In all these cases however, the gooseneck is firmly connected to the socket. It is important in that connection that a rotationally fixed connection is established between the socket and the gooseneck since during use substantial forces, in particular torsional forces, are effective. For the needed rigid support of an apparatus however the gooseneck needs to be relatively rigid but should still be bendable by hand. The gooseneck generally has a metal wire core which is profiled at the connecting end, for example flattened or provided with a polygonal shape and is received in a mounting socket and engaged therein in a form-locking manner.

The conventional non-releasable connection between a gooseneck and a mounting part is not without problems, but the problems are generally solved in that, in addition to a form-locking connection, a firm cemented connection is provided between the connecting part specifically between a gooseneck and a functional part such as a mounting socket. However, if the connection is to be releasable, it is difficult to provide a connecting structure which can withstand the torsion forces likely to occur during use of the device.

It is the object of the present invention to provide a useable connecting structure for joining a functional part and a connecting part which overcomes the problems mentioned above.

SUMMARY OF THE INVENTION

In a releasable rotationally fixed mechanical connection between a functional part and a connecting part of which one is provided with a receiver neck and the other with an insertion element adapted to be snugly received in the receiver neck, an intermediate wedge member provided with slightly conical outer surface areas is disposed on the insertion element for reception in the receiver neck which has cooperating inner surfaces with which the wedge member is pressed into firm engagement by a collar disposed on the insertion element which is threaded onto the receiver neck.

The invention will be described in greater detail below on the basis of a releasable, rotationally fixed connection between a gooseneck and a suction mounting socket (a similar connecting structure may be provided between the gooseneck and a mounting plate or an apparatus holder) with reference to the accompanying drawings.

BRIEF DESCRIPTION OF THE DRAWINGS

FIG. 1 shows the end piece of a gooseneck and of a suction mounting socket,

FIG. 2 is a side view of the arrangement shown in FIG. 1,

DESCRIPTION OF THE CONNECTING STRUCTURE

Figure 3:
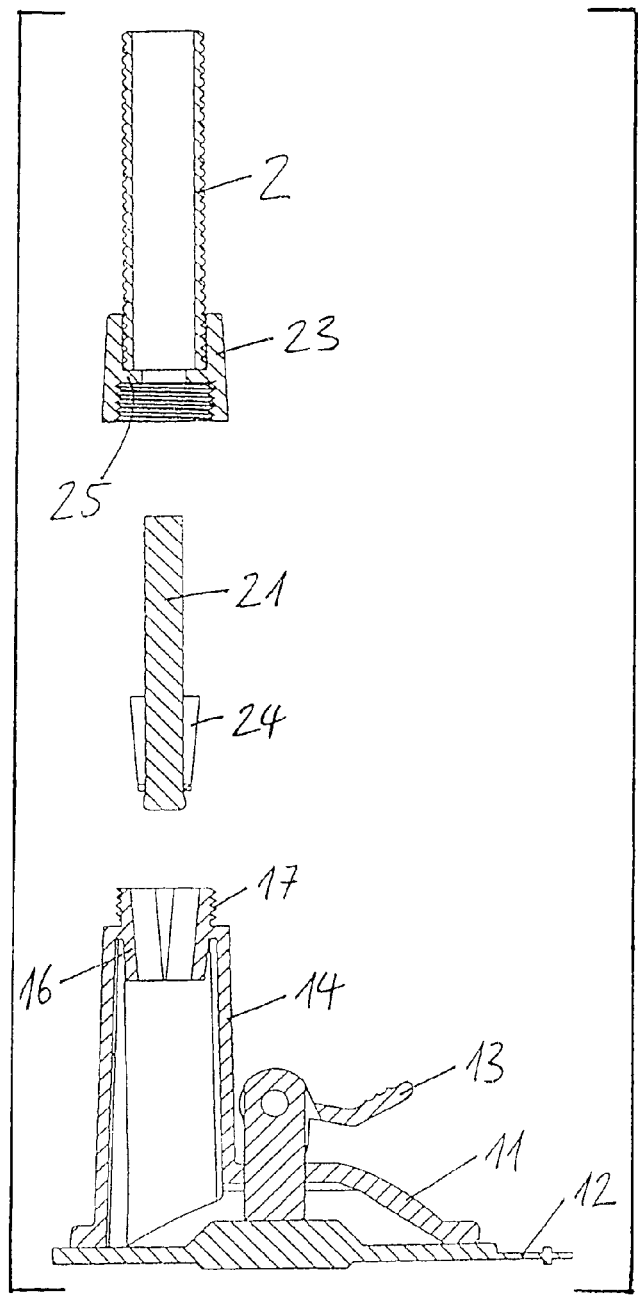
FIG. 3 is an exploded sectional view of the arrangement according to FIGS. 1 and 2, and FIGS. 4a and 4b show two different embodiments of a core wire of a gooseneck provided with an end connector piece.

FIGS. 1 and 2 are perspective and, respectively, side views of a suction mounting socket 1 and an end section of a gooseneck 2.

The suction socket 1 includes a suction foot 11 with a circumferentially projecting suction membrane 12 and an operating lever 13 as well as a socket column 14 with a receiver neck 16 provided with an external thread 17. At the inside, the receiver neck 16 is provided with a conical polygonal profile.

The gooseneck 2 comprises a core wire 21, which, as shown in FIGS. 1 and 2, is in the form of a hexagonal wire and a sleeve 22 in the form of a corrugated plastic tube or similar. The shown end piece of the gooseneck is provided with a rotatable threaded collar 23 provided with an internal thread to be threaded onto the external thread 17 of the receiver neck 16. On the end of the core wire 21, projecting from the threaded collar 23 a conical polygonal intermediate wedge member 24 is disposed which has an outer configuration complementary to the inner configuration of the receiver neck 16.

FIG. 3 is a sectional view of the suction socket 1 with the connecting structure shown in an exploded state that is the socket and the gooseneck are shown disjointed.

Figure 4A:
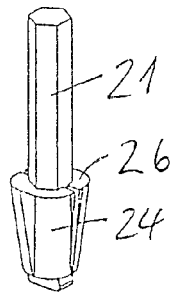
Figure 4B:
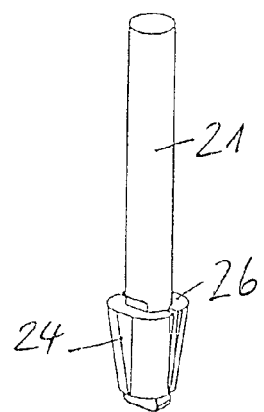

FIGS. 4a and 4b show the core wire alone. FIG. 11a shows the core wire with a hexagonal cross-section and FIG. 4b shows it with a circular cross-section, each with the intermediate wedge member 24 disposed thereon. The intermediate wedge member 24 has in each case a polygonal non-conical inner surface which cooperates with a polygonal outer surface of the core wire 21 which (in the embodiment of FIG. 4a) is already present or, (in the embodiment of FIG. 4b with a flattened end) is formed on the end of the core wire 21.

The intermediate wedge member 24 may be a slotted sleeve member as apparent from FIGS. 4a and 4b so that it can be slipped onto the core wire 21 which is slotted providing for radial resiliency and play-free contact with the core wire 21. By a slight deformation of the wire end, a form-locking connection can be established between the intermediate wedge member 24 and the end of the core wire such that the intermediate wedge member 24 is not removable from the core wire 21, at least not without the application of a substantial force.

As apparent form FIG. 3, an inner radial flange 25 of the threaded collar 23 cooperates with the rear face 26 at the thicker end of the intermediate wedge member 24. When, for joining the gooseneck with the suction foot socket, the end piece of the core wire 21 is inserted with the intermediate wedge member 24 into the receiver neck 16 and the threaded collar is threaded onto the outer thread of the receiver neck 16, the threading movement of the threaded collar 23 is converted to an axial movement of the collar 23 whereby, via the inner radial flange 25 of the threaded collar 23, the end piece of the core wire 21 is pressed together with the intermediate wedge member 24 axially into the receiver neck 16. Since the interior of the receiver neck 16 is complementarily conical to the outer configuration of the intermediate wedge member 24, the axial compression of the intermediate wedge member 24 in the receiver neck 16 is converted to a radial clamping movement. In this way, a firm radial clamping action of the outer surface of the intermediate wedge member 24 with the inner surface of the receiver neck 16 and also of the inner surface of the intermediate wedge member 24 with the outer surface of the core wire 21 is achieved. Since the intermediate wedge member 24 has on both, the inside and the outside, a polygonal profile and the inner wall of the receiver neck 16 is complementary to the outer surface of the intermediate wedge member and the outer surface of the core wire 21 is complementary to the inner surface of the intermediate wedge member, a strong form-locking rotationally rigid clamping engagement between the various components is achieved without the need for any cementing.

With the arrangement according to the invention, a highly effective but releasable connection between the connecting member (gooseneck) and the functional part (suction socket, support plate, etc.) can be established.

Applications other than those directly mentioned are possible for the structure according to the invention.

What is claimed is:

1. A releasable, rotationally fixed, mechanical connection between a support socket part (1) and a connecting part (2) of an apparatus support device, one of said parts (1) including a receiver neck (16) and the other part (2) including an insertion element (21) for accommodation in the receiver neck (16), said parts (1, 2) including fixing means (17, 23) for fixedly joining the two parts (1, 2) by relative axial movement between the insertion element (21) and the receiver neck (16), and an intermediate wedge member (24) disposed between the insertion element (21) and the receiver neck (16) and fixedly connected to the insertion element (21), said intermediate wedge member (24) having polygonal outer surface areas in engagement with cooperating polygonal inner surface areas of said receiver neck (16), said surface areas of at least one cooperating pair of surfaces being inclined in the insert direction so as to form a wedge structure providing for radial and axial interlocking of the surfaces when the intermediate wedge member (24) is axially pressed into the receiver neck (16), and a collar (23) mounted on the connecting part (2) for engaging the receiver neck (16) and axially pressing the wedge member (24) into the receiver neck (16).

2. The mechanical connection according to claim 1, wherein the intermediate wedge member (24) is a slotted sleeve.

3. The mechanical connection according to claim 2, wherein the intermediate wedge member (24) is disposed on the insertion element (21).

4. The mechanical connection according to claim 1, wherein the insertion element (24) has a diameter which becomes smaller in the insertion direction forming converging outer surface areas and the receiver neck (16) has correspondingly converging inner surfaces.

5. The mechanical connection according to claim 4, wherein the insertion element (24) has inner surface areas which extend parallel to the insertion direction and which cooperate with outer surfaces of the insertion element (21) extending also parallel to the insertion direction.

6. The mechanical connection according to claim 1, wherein the collar (23) disposed on one of the parts (1, 2) is threaded and a threaded section is formed on the other part (2, 1).

7. The mechanical connection according to claim 6, wherein the threaded collar (23) comprises an abutment structure (25) engaging the intermediate wedge element (24) so as to force the intermediate wedge element (24) during threading of the threaded collar (23) onto the collar (16) into the collar and into firm engagement with the inclined wall portions thereof.

8. The mechanical connection according to claim 1, wherein the connecting part (2) is a so-called gooseneck including a metallic core rod (21) forming the insertion element and the functional part (1) is one of a mounting socket, an apparatus holder and a mounting plate.

\* \* \* \* \*